United States Patent [19]  [11] 4,440,484
Komoto et al.  [45] Apr. 3, 1984

[54] CAMERA LENS BARREL HAVING RETRACTABLE MOVABLE CONTACTS

[75] Inventors: Shinsuke Komoto; Yasuyuki Haneishi, both of Tokyo, Japan

[73] Assignee: Asahi Kogaku Kogyo Kabushiki Kaisha, Tokyo, Japan

[21] Appl. No.: 369,770

[22] Filed: Apr. 19, 1982

[30] Foreign Application Priority Data

Apr. 21, 1981 [JP] Japan ............................ 56-57504[U]

[51] Int. Cl.³ ............................................. G03B 17/14
[52] U.S. Cl. .................................. 354/286; 354/289.12
[58] Field of Search .......................... 354/46, 286, 289

[56] References Cited
U.S. PATENT DOCUMENTS 4,104,649 8/1978 Tanaka et al. ...................... 354/286
4,357,089 11/1982 Okura et al. ........................ 354/286

Primary Examiner—A. A. Mathews
Attorney, Agent, or Firm—Sughrue, Mion, Zinn, Macpeak & Seas

[57] ABSTRACT

A lens barrel for a camera body, having a first mount electrically connected to a first branch circuit and a first electrical contact connected to a second branch circuit, has a movable second contact which is retractable into a surface of a second mount on the lens barrel. A switching member is electrically connected to the movable second contact and is adapted to extend and retract the latter so that the movable second contact is electrically connected to the first contact of the camera body when extended, and is spaced apart therefrom when retracted. The switching member has a lower end portion having a third contact thereon, which electrically connects the switching member, the movable second contact and the second branch circuit with the first branch circuit when the movable second contact is extended.

8 Claims, 5 Drawing Figures

CAMERA LENS BARREL HAVING RETRACTABLE MOVABLE CONTACTS

BACKGROUND OF THE INVENTION

1. Field of the Invention

The present invention relates to a camera lens barrel having electrical contacts through which data from the lens are transmitted to the camera body.

2. Description of the Prior Art

Two automatic exposure control systems are available for automatic exposure control type cameras. The first automatic exposure control system is a shutter-priority system wherein an exposure time or a shutter speed is manually selected by the photographer with priority, and the size of the aperture opening is determined by the camera from the shutter speed thus selected so as to automatically provide suitable exposure. The second automatic exposure control system is an aperture-priority system wherein the aperture size is selected by the photographer, and the exposure time is automatically controlled by the camera so that, again, suitable exposure is provided using the shutter speed thus selected. For convenience in description, the first system will be referred to as "auto", and the second system will be referred to as "manual". The term "manual", as used herein, is broadly defined to also include the case where the photographer manually sets both the shutter speed and the aperture size without using the automatic exposure control of the camera.

In general, in carrying out an automatic exposure control and in displaying the shutter speed and the aperture size according to the automatic exposure, data from the lens, such as the maximum aperture size and the minimum aperture size of the lens, must be transmitted to the camera body when the exchangeable lens is coupled to the camera body. In order to satisfy this requirement, electrical contacts are provided on the confronting surfaces of the mounts of the camera body and of the photographing lens, respectively, so that data from the lens are transmitted, as electrical signals, directly to the camera body from the lens. The electrical contacts are urged to protrude slightly from the mount surfaces so that, as soon as the lens is mounted on the camera body, the necessary circuit or circuits are completed and data, such as maximum and minimum lens aperture sizes, can be transmitted to a control circuit or the like in the camera body.

However, since the electrical contacts protrude as described above, when coupling the photographing lens to the camera body, the electrical contacts of the camera body are rubbed by the electrical contacts of the lens so that the circuits are completed temporarily. As a result, power consumption occurs and the arithmetic operation of the control display may be carried out erroneously.

SUMMARY OF THE INVENTION

Accordingly, the present invention is a lens barrel having movable contacts which are retractable into a surface of the lens mount. The lens barrel also has a switching member for moving the movable contacts, and means for electrically connecting the movable contacts with a branch circuit in a camera body. Since the movable contacts can be retracted into the surface of the lens mount so as not to protrude therefrom when the lens is mounted on the camera body, the lens can be mounted on the camera body without causing the electrical contacts of the lens to contact the electrical contacts on the camera mount. While operating the camera after the lens has been attached thereto, the switching member can be set to "auto" so that the necessary electrical contacts on the lens protrude from the mount surface of the lens, thereby allowing lens data signals to be transmitted to the camera.

DESCRIPTION OF THE PREFERRED EMBODIMENT

Figure 1A:
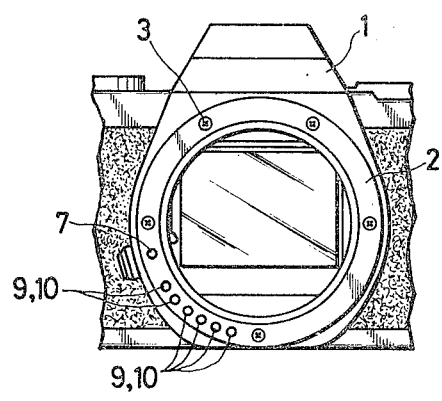
FIG. 1A is a partial front view illustrating a camera body.

FIG. 1A is a front view showing a part of a camera body 1. A mount 2 is secured to the camera body 1 with screws 3. The mount 2 is plated and made of brass; therefore, the mount 2 is electrically conductive. The mount 2 is connected to a branch path of a control circuit or the like which is provided on the camera.

Figure 1B:
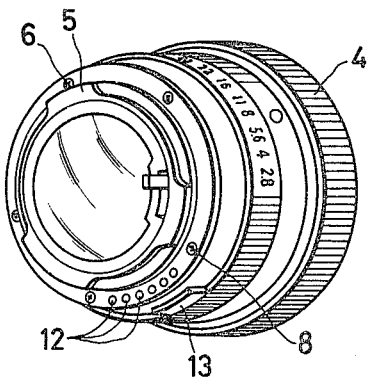
FIG. 1B is a perspective view of a lens barrel attachable to a camera body.

FIG. 1B is a perspective view of a lens barrel 4 which is to be coupled to the mount 2 on the camera body 1. Similarly, as in the case of the camera body 1, a mount 5, which is plated and made of brass and, therefore, electrically conductive, is fixedly secured to the lens barrel 4 with screws 6.

The mounts 2 and 5 each contain a plurality of electrical contacts 10 and 12, respectively. The electrical contacts 10 and 12 on the mounts 2 and 5 are connectable together in pairs when the lens barrel 4 is connected to the camera body. Data selected according to whether the camera is operated manually or automatically are transmitted from the lens to the camera body by certain pairs of the electrical contacts 10, 12. Other pairs of contacts 10, 12 transmit, from the lens to the camera body, data indicative of inherent aperture sizes (such as full-aperture sizes, minimum aperture sizes, electrical data as to current, etc.), which are controlled by electrical elements such as resistance, etc., unique to the lens being used. Since different lens barrels have different characteristics (such as full-aperture sizes), the number of contacts adapted to transmit the data of inherent aperture size and their positions differ, depending on the particular lens barrel being used.

Figure 2:
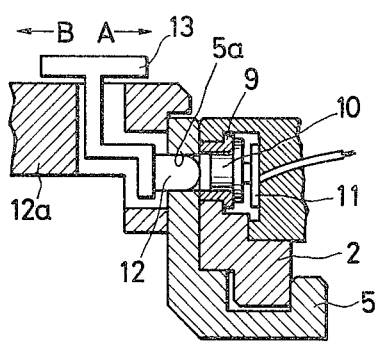
FIG. 2 is a vertical sectional view illustrating essential components of one embodiment of the present invention.

The lens barrel 4 shown in FIG. 1B is coupled to the camera body 1 through a bayonet engagement, as is apparent from FIGS. 1A and 1B. When the lens barrel 4 is turned to the end to be coupled to the camera body 1, a lock pin 7, which protrudes elastically from the mount 2 of the camera body, enters a lock groove 8 formed in the mount 5 on the lens side, and the pairs of contacts connect together electrically. These mounts and the electrical contacts on the mounts are arranged as shown in FIGS. 2, 3 and 4.

A contact pin 10, which is insulated from the mount 2 of the camera body by a collar 9, is brought into contact with a plate 11. The plate 11 is connected to one branch path of an exposure control circuit (not shown) or the like, which is provided in the camera body. Thus, the contact pin 10 is fixed as shown in FIGS. 2–4. Another branch circuit is electrically connected to the camera mount 2.

In addition, a contact pin 12 on the lens is slidably engaged within a hole 5a formed in the mount 5 of the lens barrel. One end portion of the contact pin 12 is connected to a switching member 13, which is provided in the fixing ring 12a of the lens barrel 4. When the switching member 13 is switched from "manual" to "auto" (or when it is moved in the direction of the arrow A in FIG. 2), the contact pin 12 is protruded from the lens mount surface to contact the contact pin 10 on the camera body side. As a result, the mount 2, the mount 5, the contact pin 12 and the contact pin 10 are electrically connected so that the branch path of the circuit connected to the mount 2 of the camera body is electrically connected to the branch path of the circuit connected to the contact pin 10 of the camera mount 2. Depending on the number of contact pins thus electrically connected and their positions, data on the inherent aperture size of the lens and other relevant data are transmitted to the exposure control circuit or the like in the camera body. On the other hand, when the switching member 13 is switched from "auto" to "manual", the contact pin 12 is retracted from the lens mount source to electrically disconnect the above-described components from one another.

Figure 3:
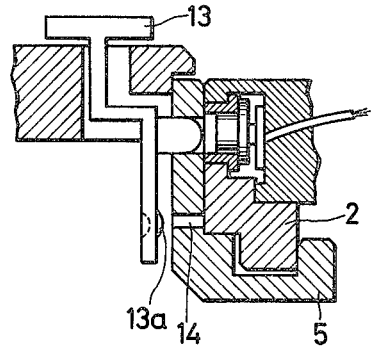
FIGS. 3 and 4 are vertical sectional views illustrating essential components of further embodiments of the present invention.
Figure 4:
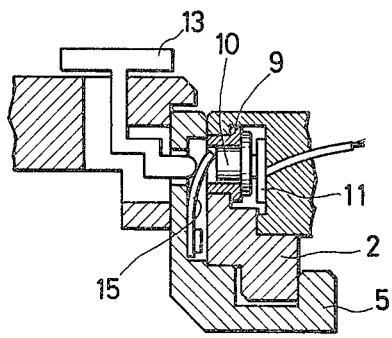

FIG. 3 shows another example of the above-described electrically connecting means in which a mount 5 on the lens is made of insulating material. The lower end portion of the switching member 13 is extended, and a contact 13a is provided on the end thereof. An electrically conductive pin 14 is embedded in the mount 5 of the lens barrel in such a manner that one end of the pin 14 can contact the contact 13a, the other end of the pin 14 being in contact with the mount 2 of the camera body. Therefore, when the switching member 13 is switched to "auto", the contact 13a is brought into contact with the pin 14, and the above-described electrically conducting operation is achieved.

FIG. 4 shows another example of the electrical connecting means according to the invention. In the above-described examples, the contact pin 12, connected to the switching member 13, contacts the contact pin 10 on the camera body side. In the example shown in FIG. 4, a flexible contact plate 15 is secured to the lens mount 5 at one end thereof so that, when the other end is pushed by the end of the switching member 13, the contact plate 15 is bent, thus contacting the contact pin 10 on the camera mount 2.

Since the lens barrel is constructed as described above, all the electrical contacts in the lens are retracted inwardly from the mount surface thereof by setting the switching member to the "manual" position. Therefore, if, in coupling the lens barrel to the camera body, the switching member is set to the "manual" position in advance, the electrical contacts on the lens side will never contact the electrical contacts on the camera body side and will never interfere with the mount securing screws and the lock groove. Furthermore, since the circuits are maintained inoperative because of the retraction of the electrical contacts, the power source of the camera will not be consumed, and no trouble will be caused with control display and arithmetic operations. Therefore, the necessary signals can be completely transmitted from the lens side to the camera body side by setting the switching member to the "auto" position from the "manual" position.

We claim:

1. A lens barrel for a camera body having a first mount electrically connected to a first branch circuit and at least one first contact electrically connected to a second branch circuit, comprising:
    a second mount;
    means for mounting said second mount onto said first mount;
    at least one movable second electrical contact located on said second mount, said movable second contact being retractable and extendable into and out of a surface of said second mount, said movable second contact being spaced apart from said first contact when retracted, said movable second contact being electrically connected with said first contact when extended;
    switching means connected to said movable second contact for transmitting movement thereto;
    means for electrically connecting said second contact to said first mount of said camera body so that said first branch circuit, said movable second contact, and said first contact are electrically connected with said second branch circuit of said camera body when said movable second contact is extended;
    said switching means comprising a switching member integrally connected to said movable second contact, a first end of said switching member extending radially outward beyond an outer surface of said second mount, said first end being movable along an axial direction of said lens barrel to extend and retract said movable second contact.

2. The lens barrel claimed in claim 1 wherein said movable second contact transmits specific lens data to said first and second branch circuits of said camera body when said movable second contact is extended.

3. The lens barrel claimed in claim 2 further comprising a plurality of movable second contacts which, when extended, are electrically connected to a plurality of corresponding first contacts of said camera body.

4. The lens barrel claimed in claim 1, 2 or 3 wherein said electrical connecting means comprises a connection between said movable second contact and said second mount, said second mount being made of a material which is electrically conductive.

5. The lens barrel claimed in claim 1, 2 or 3 wherein said electrical connecting means comprises an electrical conductive pin located in said second mount, one end of said pin being in electrical contact with said first mount of said camera body; and
    a third contact located near a second end of said switching member, said third contact being in electrical contact with said pin when said movable second contact is extended and being spaced apart from said pin when said movable second contact is retracted;
    said switching member being electrically connected to said movable second contact.

6. The lens barrel claimed in claim 1, 2 or 3 wherein said electrical connecting means comprises a flexible conducting plate one end of which is secured to said second mount and is electrically connected to said first mount, an opposite end of said plate being positioned in front of said movable second contact, said opposite end contacting said first contact of said camera body when said movable second contact is extended, and being spaced apart from said first contact when said movable second contact is retracted.

7. A lens barrel for a camera body having a first mount electrically connected to a first branch circuit and at least one first contact electrically connected to a second branch circuit, comprising:
- a second mount;
- means for mounting said second mount onto said first mount;
- at least one movable second electrical contact located on said second mount, said movable second contact being retractable and extendable into and out of a surface of said second mount, said movable second contact being spaced apart from said first contact when retracted, said movable second contact being electrically connected with said first contact when extended;
- switching means connected to said movable second contact for transmitting movement thereto; and
- means for electrically connecting said second contact to said first mount of said camera body so that said first branch circuit, said movable second contact, and said first contact are electrically connected with said second branch circuit of said camera body when said movable second contact is extended;
- said electrical connecting means comprising an electrical conductive pin located in said second mount, one end of said pin being in electrical contact with said first mount of said camera body, and a third contact located on a lower end portion of said switching means, said third contact being in electrical contact with said pin when said movable second contact is extended and being spaced apart from said pin when said movable second contact is retracted;
- said switching means being electrically connected to said movable second contact.

8. A lens barrel for a camera body having a first mount electrically connected to a first branch circuit and at least one first contact electrically connected to a second branch circuit, comprising:
- a second mount;
- means for mounting said second mount onto said first mount;
- at least one movable second electrical contact located on said second mount, said movable second contact being retractable and extendable into and out of a surface of said second mount, said movable second contact being spaced apart from said first contact when retracted, said movable second contact being electrically connected with said first contact when extended;
- switching means connected to said movable second contact for transmitting movement thereto; and
- means for electrically connecting said second contact to said first mount of said camera body so that said first branch circuit, said movable second contact, and said first contact are electrically connected with said second branch circuit of said camera body when said movable second contact is extended;
- said second electrical connecting means comprising a flexible conducting plate one end of which is secured to said first mount, an opposite end of said plate being positioned in front of said movable second contact, said opposite end contacting said first contact of said camera body when said movable second contact is extended, and being spaced apart from said first contact when said movable second contact is retracted.

* * * * *